United States Patent [19]
Knigge

[11] Patent Number: 5,377,482
[45] Date of Patent: Jan. 3, 1995

[54] HYDRAULIC LIFT ROTARY RAKE

[75] Inventor: Walter N. Knigge, Manitowoc, Wis.

[73] Assignee: Miller-St. Nazianz, Inc., St. Nazianz, Wis.

[21] Appl. No.: 116,326

[22] Filed: Sep. 3, 1993

[51] Int. Cl.$^6$ ............................................. A01D 78/10
[52] U.S. Cl. ............................ 56/370; 56/DIG. 21; 56/367
[58] Field of Search ............. 56/370, 377, 384, 367, 56/396, 397, DIG. 10, DIG. 11, DIG. 21, 214, 374

[56] References Cited

U.S. PATENT DOCUMENTS

| | | | |
|---|---|---|---|
| 3,546,867 | 12/1970 | Hauser-Lienhard | 56/370 |
| 3,645,077 | 2/1972 | Hauser-Lienhard | 56/366 |
| 3,832,838 | 9/1974 | Hale | 56/377 |
| 4,015,412 | 4/1977 | Reber | 56/370 |
| 4,161,860 | 7/1979 | van der Lely | 56/370 |
| 4,194,348 | 3/1980 | Gerlinger | 56/377 |
| 4,275,552 | 6/1981 | DeCoene | 56/370 |
| 4,288,972 | 9/1981 | Rostoucher | 56/370 |
| 4,864,809 | 9/1989 | van der Lely et al. | 56/377 |
| 4,875,332 | 10/1989 | Aron | 56/377 |
| 4,905,466 | 3/1990 | Heppner | 56/364 |
| 4,914,901 | 4/1990 | Aron | 56/370 |
| 4,976,095 | 12/1990 | Schnittjer | 56/350 |
| 5,163,277 | 11/1992 | Fransgaard | 56/366 |

OTHER PUBLICATIONS

Stoll High performance two-rotor Rakes (P 1241 e).
M&W SR320P Rotary Hay Rake Brochure.
Kuhn GA Gyrorakes '91 Pamphlet.
Tonutti s.p.a. Rotary Rakes Brochure.
Fella Rotary Windrower, Sep. 1991 Pamphlet.

*Primary Examiner*—Ramon S. Britts
*Assistant Examiner*—James A. Lisehora
*Attorney, Agent, or Firm*—Nilles & Nilles

[57] ABSTRACT

A rotary rake is provided with a hydraulic lifting mechanism for raising and lowering the rake. A vertical shaft extending through the center of a rotary gearbox on the rake serves as a hydraulic fluid port. Pressurized hydraulic fluid from a remote source passes through the shaft to a hydraulic cylinder mounted on a support frame. The hydraulic cylinder operates a mechanical linkage which raises and lowers the rake. The mechanical linkage includes an over-center position for securely holding the rake in the raised position.

20 Claims, 5 Drawing Sheets

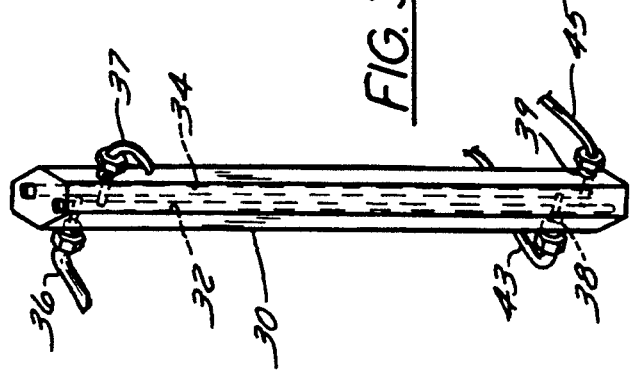
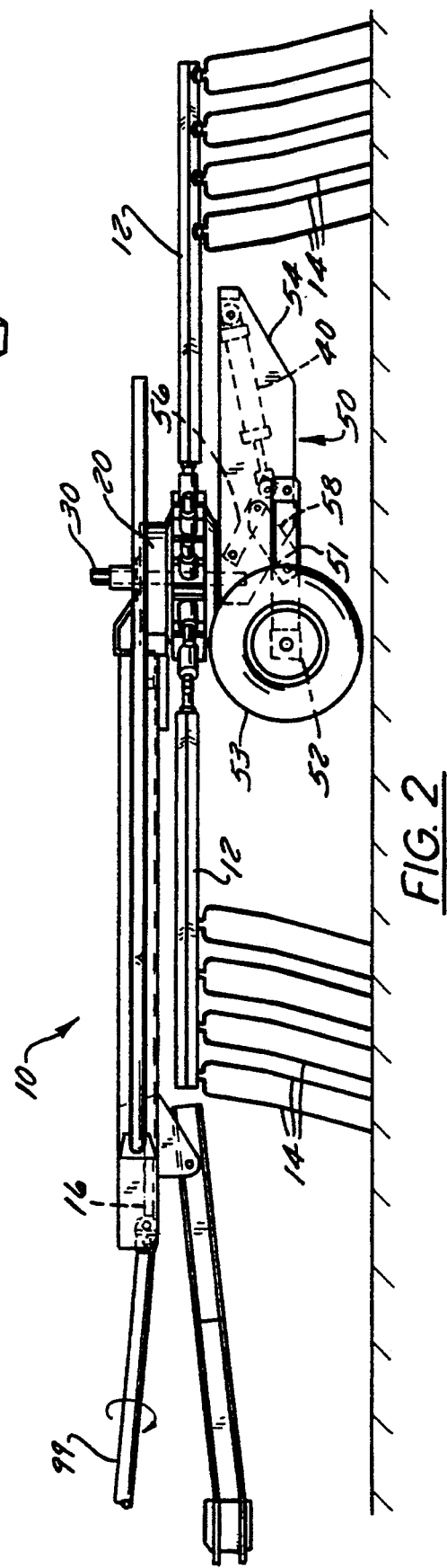

HYDRAULIC LIFT ROTARY RAKE

BACKGROUND OF THE INVENTION

1. Field of the Invention

The present invention relates to a hay making machine used for raking and windrowing hay. More particularly, the present invention relates to a rotary-style rake which includes a hydraulically powered lifting mechanism for raising and lowering the rake between working and transporting positions, respectively.

2. Background of the Related Art

In the hay making process, the crop is cut and allowed to dry in the field. Later, the dried crop material has to be raked together in windrows prior to being baled. A farm implement known as a rotary rake is commonly used for such purpose.

A rotary rake comprises a rotary gearbox which rotates a set of rake arms in a rotary fashion about a common axis. The upper side of the gearbox is coupled to the power takeoff (PTO) on the tractor which pulls the rake through the hay field. The gearbox is supported from below by a frame with one or more wheels for transporting the rotary rake. During operation, the rake arms sweep completely around the wheel base of the frame.

To operate the rotary rake in the field, the rake is lowered so that the tips of the rake arms contact the crop. To transport the implement on a roadway, the rake is raised or in some cases disassembled.

A number of rotary style rakes with mechanisms for raising and lowering the machine are known in the prior art. For example, U.S. Pat. No. 3,546,867 relating to a hay harvesting machine, discloses a rotary mechanism 1 rotatably driven about an upright tubular shaft 6. A threaded spindle 40 runs through the center of the tubular shaft 6. By rotating a crank handle 37, the spindle 40 pivots a support frame 32 and tire 31 about fulcrum point 33 to raise or lower the machine. It is also suggested that the spindle 40 may be adjusted by a chain and sprocket drive mechanism which could be operated from the driver seat of the tractor.

U.S. Pat. No. 4,275,552 shows a rotary gearbox which rotates about support shaft 41. Beneath the gearbox is a frame 48 with a series of apertures 49 for locking a wheel arm 50 in any number of selected positions for adjustment of the height of the rotor assembly. When adjusting the height of the rotor assembly, the wheel arm 50 pivots about a transverse axis 51. On the lower end of the wheel arm 50 is wheel 52.

Other kinds of rotary rakes are also disclosed in the prior art. For example, U.S. Pat. No. 4,161,860 shows a rotary rake in which the extending tine carriers 34 rotate about shaft 21, and further shows a ring 47 with a swash plate 42 and universal ball and socket joints 51 and 52 to operate the raking tines. U.S. Pat. No. 4,914,901 shows a rotary gearbox 9 which rotates about a vertical support pin 17 supported by plate 33. U.S. Pat. No. 4,288,972 also shows a gearbox 1 mounted for rotation about a shaft 11. Other rotary raking devices are shown in U.S. Pat. Nos. 3,645,077, 3,832,838, 4,015,412, 4,194,348, 4,875,332, 4,905,466 and 4,976,095.

The difficulty in designing an automated mechanism for raising or lowering the rake is due to the inaccessibility of the underside of the rotary gearbox. As mentioned above, the power coupling is made on the top side of gearbox, while the frame and wheel base support the underside of the gearbox, and the rake arms sweep entirely around the wheel base thereby effectively isolating the upper and lower portions of the machine. There is no easy path to transfer power from above the gearbox to any kind of mechanism that might be located on the support frame below the gearbox.

A further disadvantage with the known devices, such as the hand crank disclosed in U.S. Pat. No. 3,546,867, discussed above, is that the operator must get off the tractor in order to raise or lower the rake. On other devices, the operator may be required to get off the tractor to insert a separate lock pin to secure the implement in the raised position in order to safely transport it on a public roadway.

It would therefore be desirable to provide a rotary rake which has a means for automatically raising and lower the rake so that the operator would not have to leave his seat on the tractor in order to convert the implement from a working position to a transporting position and vice versa. Further, it would be desirable to provide a rotary rake which can be raised and secured into a transport position, again without requiring the operator to leave the seat on the tractor, in order to secure the implement for safe transport down a public roadway.

SUMMARY OF THE INVENTION

A rotary-type raking machine having a hydraulic lifting mechanism for raising and lowering the machine is disclosed.

Pressurized hydraulic fluid from a fluid reservoir on the tractor is supplied to a location near the upper portion of the rotary gearbox. A vertical shaft running straight down through the center of the rotary gearbox provides fluid communication from the point above the rotary gearbox to a point below the rotary gearbox. The hydraulic ports in the shaft permit hydraulic fluid to flow down through the middle of the gearbox to a hydraulic cylinder located beneath the rotary gearbox. The cylinder is used for operating a mechanical linkage on the frame to raise and lower the machine. Therefore, hydraulic fluid from the tractor flows from above the gearbox, down through the shaft to the hydraulic cylinder underneath the gearbox.

The mechanical linkage is further provided with an over-center position for holding the rake in the raised position (i.e. the transport position), so that the operator does not have to get off the tractor in order to insert a safety pin or other locking mechanisms. Also, the hydraulic lifting mechanism is designed so that the hydraulic fluid in the lines is static and under no pressure when the machine is in either the raised or lowered positions. High pressure in hydraulic lines can be hazardous, particularly when coupling and uncoupling equipment. The user may therefore safely connect or disconnect the rake in either the raised or lowered position.

The primary objects of the invention are therefore to provide a rotary rake with a vertical shaft extending through the center of a rotary gearbox, the shaft functioning both to support the gearbox and to provide a fluid port through the gearbox to a hydraulically powered lifting mechanism for raising and lowering the rake; to provide a hydraulically powered lifting mechanism which has an over-center position so that a separate step of securing the rake for transport is not necessary; to provide a hydraulic lifting mechanism on a rotary rake which utilizes hydraulic power from a remote source to raise and lower the rake; to provide a hydraulic lifting mechanism for a rotary rake such that the hydraulic lines may be connected and disconnected under relatively lower pressure regardless of whether the rake is in the raised or lowered position.

Other objects and advantages of the invention will become apparent from the following description which sets forth, by way of illustration and example, certain preferred embodiments of the invention.

BRIEF DESCRIPTION OF THE DRAWINGS

The drawings, which constitute a part of the specification and show an exemplary embodiment of the present invention, include the following:

FIG. 2 is a side elevation view of the rotary rake with the hydraulic cylinder and mechanical linkage shown in dashed lines.

FIG. 3 is a perspective view of a hex-shaped vertical shaft which functions to both secure the rotary gearbox to the support frame and to provide a fluid port through the center of the rotary gearbox.

DETAILED DESCRIPTION

Figure 1:
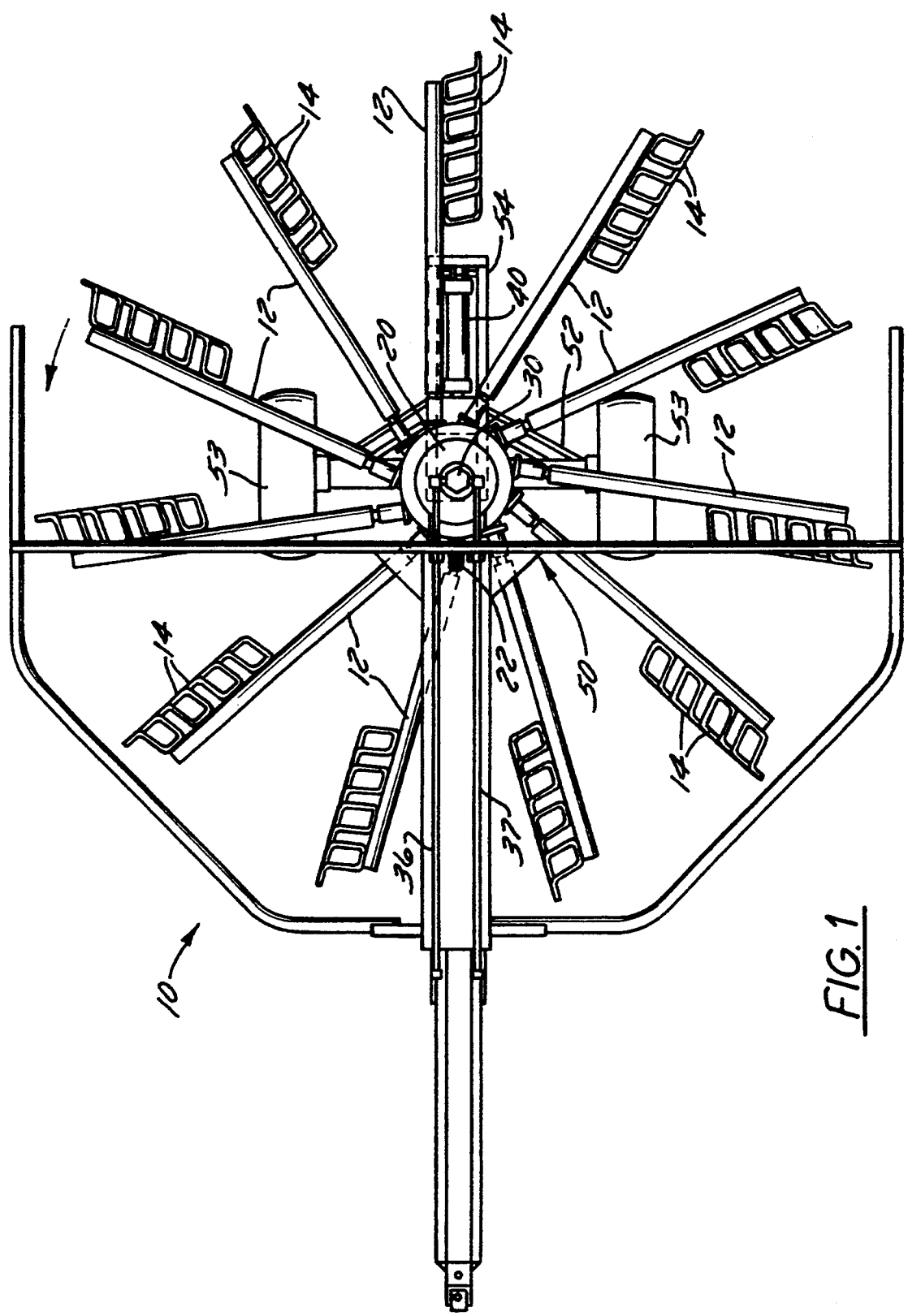
FIG. 1 is a top plan view of a rotary rake constructed in accordance with the principles of the invention.

Referring to the drawings, FIGS. 1 and 2 illustrate a hydraulic lift rotary rake 10 which embodies the features of the present invention. The major elements of the rake 10 include a set of rake arms 12, a rotary gearbox 20 for rotating the set of rake arms, a hydraulic circuit, a hydraulic cylinder 40, and a support frame 50 which includes a mechanical linkage for raising and lowering the rotary rake. The structure of each of these major elements will now be discussed more specifically.

The rake arm 12 consists essentially of a long metal pole with a number of long rake fingers 14 on one end of the pole. The rake fingers 14 extend in a direction generally perpendicular to the length of the pole. A set of several rake arms 12 extend radially from a common axis. The rake arms 12 are rotated about the common axis such that the rake arms 12 sweep in a circular fashion around the rotary rake. The rake arms 12 move on a common plane which is generally parallel to the ground, and the rake fingers 14 extend from the rake arms 12 down toward the ground.

The rake arms 12 are attached to a rotary gearbox 20, i.e., the center of the rotary gearbox 20 is the common axis about which the rake arms 12 rotate. An upper portion of the rotary gearbox 20 is provided with a means for coupling 22 the rotary gearbox 20 to a remote power source, such as a typical power take-off (PTO) on a farm tractor. The means for coupling the rotary gearbox to a remote mechanical force may include a PTO shaft 99, a drive shaft 16 and a coupling collar 18. Mechanical rotational force from the PTO shaft 99 is thus transformed to a rotational force such that the set of rake arms 12 sweep about the rotary gearbox 20. The rotary gearbox 20 is of a conventional, rotary-type gearbox, such as Model RW90-11 available from Tonutti S.P.A., Italy.

The hydraulic circuit provides fluid communication from a remote source of pressurized hydraulic fluid to the hydraulic cylinder 40. The remote source will usually be a hydraulic reservoir commonly found on a typical farm tractor. Fluid communication is provided from a location above the gearbox 20 to a point below the gearbox 20 through the use of a hex-shaped shaft 30, shown in FIG. 3. The hex-shaped shaft 30 extends vertically through the center of the rotary gearbox 20. The hex-shaped shaft 30 is used to both support and secure the rotary gearbox 20 to the frame 50 of the rotary rake 10, and further to provide a hydraulic fluid port through the center of the rotary gearbox 20. The hex-shaped shaft 30 includes a pair of fluid passageways 32 and 34 which extend from one end of the shaft 30 to the other end. The upper portion of the shaft 30, which partially protrudes above the rotary gearbox 20, is coupled to the remote source of pressurized hydraulic fluid, i.e., to the hydraulic system on the tractor. The lower portion of the hex-shaped shaft 30, which extends below the rotary gearbox 20, is coupled to the hydraulic cylinder 40. Because the preferred embodiment described herein utilizes a double-acting hydraulic cylinder 40 (discussed further below), the hex-shaped shaft 30 shown in FIG. 3 has two hydraulic passageways 32 and 34. However, it is possible to configure a hydraulic lifting means utilizing only a single-action hydraulic cylinder, and thus requiring only a single fluid passageway in the shaft.

Figure 4:
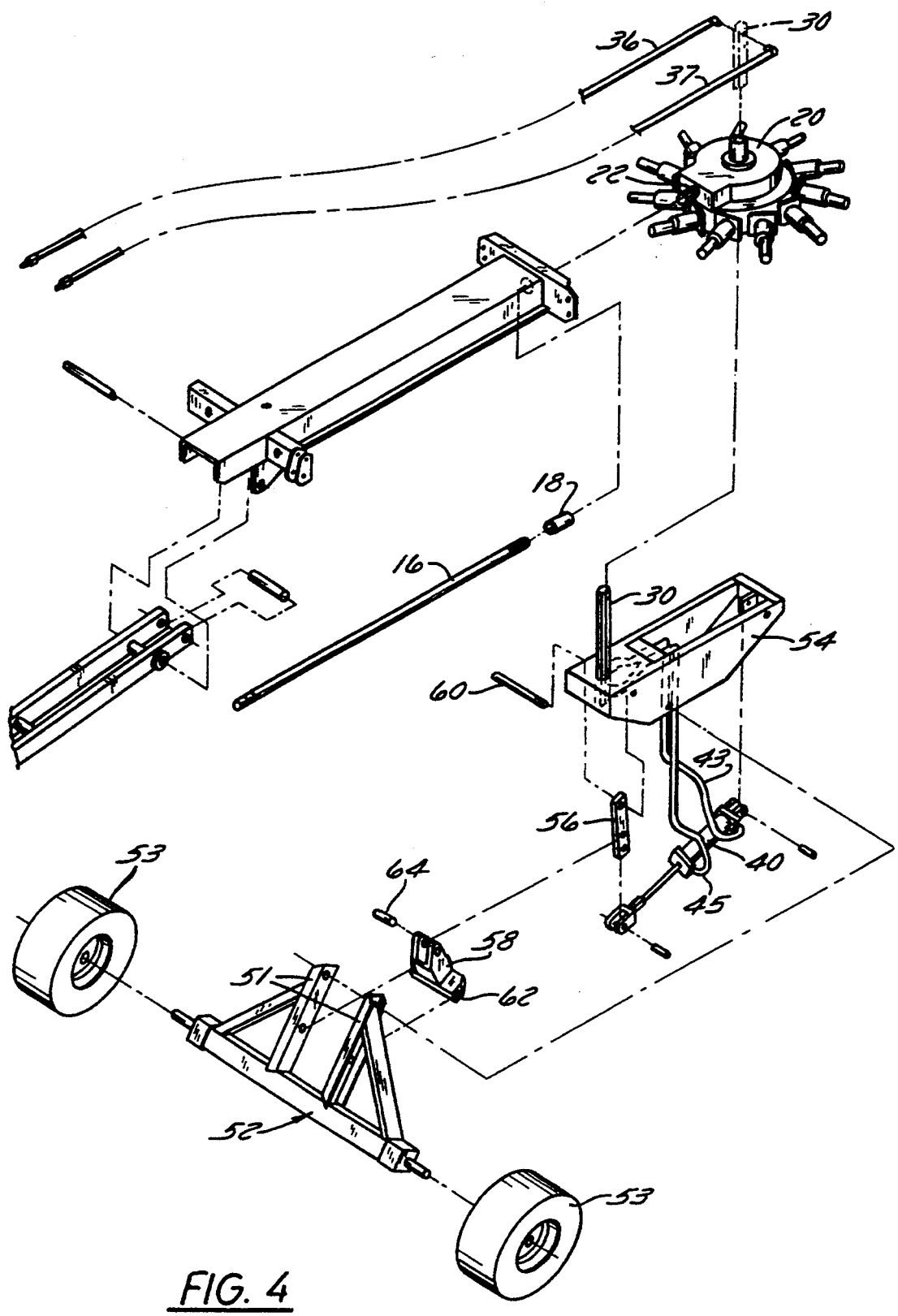
FIG. 4 is an exploded, perspective view of the primary components of the present invention.
Figure 5:
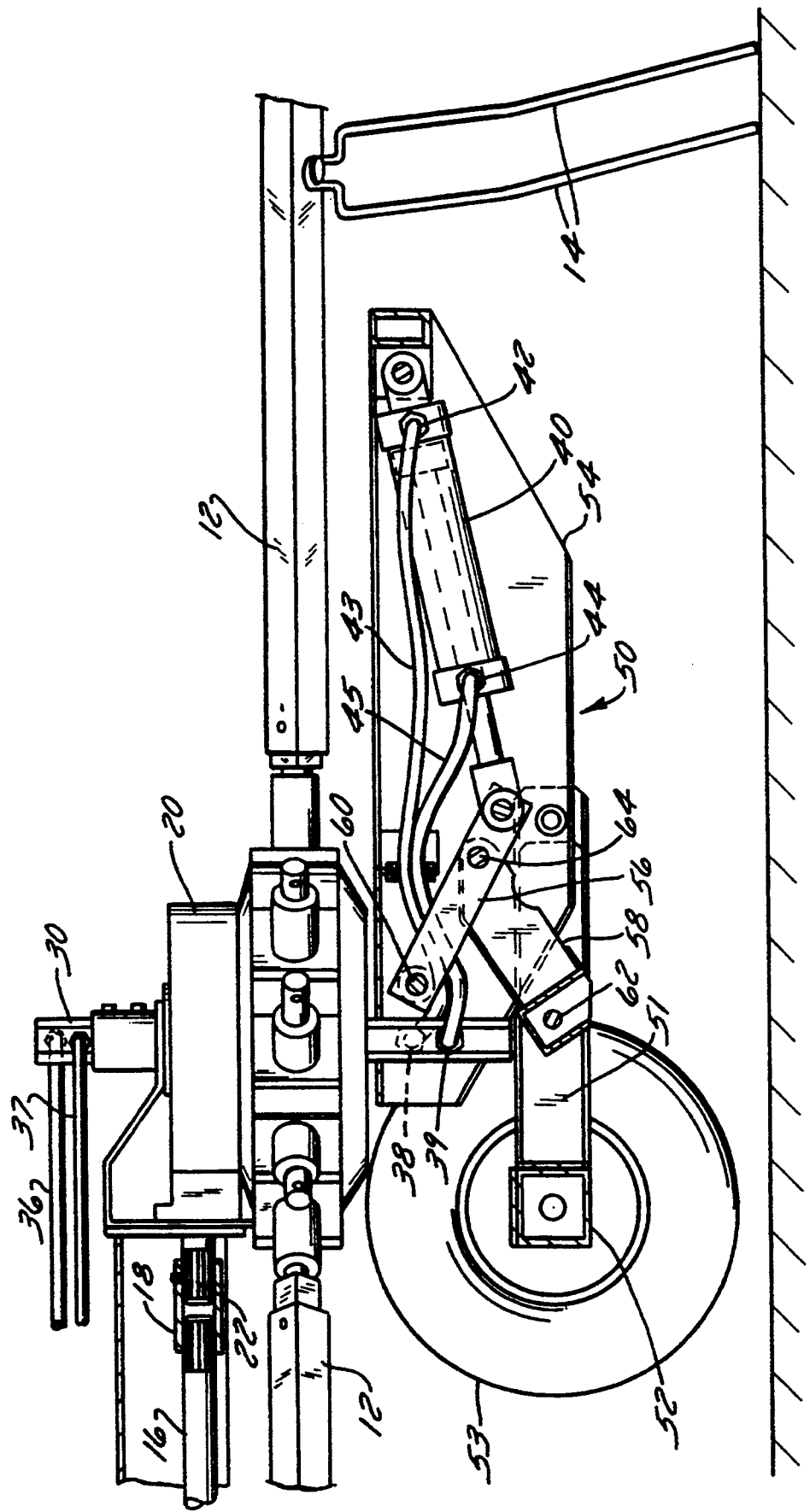
FIG. 5 is a side, sectional view showing the position of the mechanical linkage when the rotary rake is lowered to a field working position.
Figure 6:
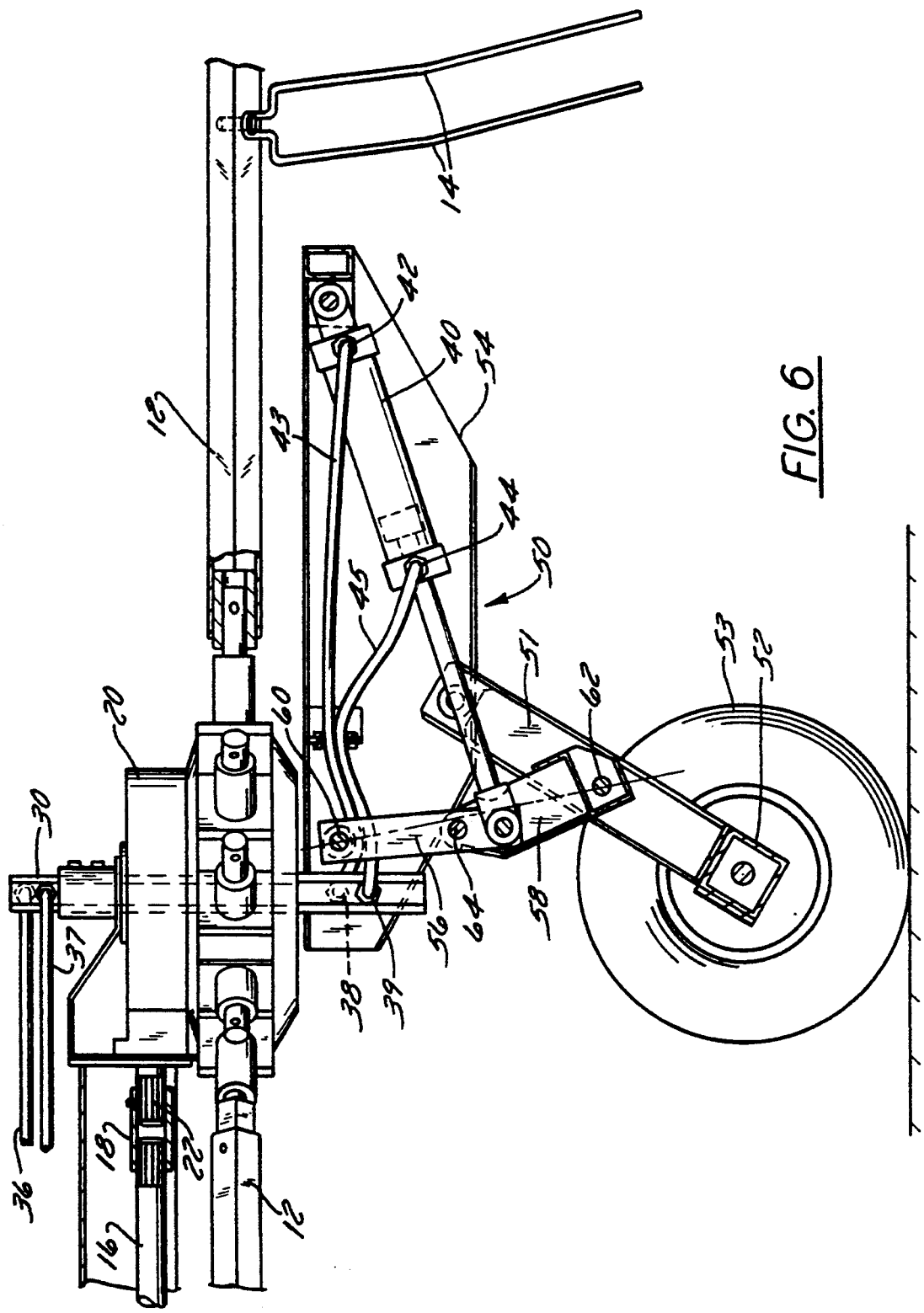
FIG. 6 is a side, sectional view of the rotary rake showing the position of the mechanical linkage when the rake is in a raised position for transport down a roadway.

The support frame and mechanical linkage 50 for raising and lowering the rotary rake 10 will now be described in further detail. Referring to FIGS. 4, 5 and 6, the major elements include a wheel base assembly 52, a center frame member 54, a first lift link 56, and a second lift link 58. These major elements in effect comprise a four-bar linkage for raising and lowering the rake.

The wheel base assembly 52 comprises a weldment with an axle frame and a pair of wheel and tire assemblies 53 attached to each end of the axle. The wheel base assembly 52 further includes a pair of support braces 51 which extend in a direction generally perpendicular to the axle. The center frame member 54 comprises a generally elongated metal weldment arranged lengthwise in a direction generally perpendicular to the axle on the wheel base assembly 52. The center frame member 54 is pivotally connected to the support braces 51 on the wheel base assembly 52. The first lift link 56 comprises an elongated bar pivotally connected to the center frame member 54. The second lift link 58 comprises an elongated bar pivotally connected to the support braces 51 on the wheel base assembly 52. The first and second lift links 56 and 58 are pivotally connected to each other.

The hydraulic cylinder 40 is operably connected to the mechanical linkage 50 in order to raise and lower the rotary rake 10. In particular, the hydraulic cylinder 40 is pivotably connected to the center frame member 54 and to one of the lift links. In the preferred embodiment described herein, the drawings show the hydraulic cylinder 40 being connected to the first lift link 56, although in practice it could be connected to either the first or second lift link, or even to both of them at a common pivot point.

The operation of the hydraulic circuit, hydraulic cylinder 40 and mechanical linkage 50 will now be described in further detail. Reference is made primarily to FIG. 5, which shows the rotary rake 10 in a lowered position, and to FIG. 6, which shows the rotary rake 10 in a raised position for transport on a roadway and from field to field.

With reference to FIG. 5, the rotary rake 10 is shown in a lowered or working position in that the rake fingers 14 contact the crop. In this position, the hydraulic cylinder 40 is fully retracted. The first and second lift links 56 and 58 are pivoted at an acute angle relative to each other so that the four-bar linkage is in a generally collapsed state thereby resulting in the rotary rake 10 being set in its lowest position.

Pressurized hydraulic fluid from the tractor enters the fluid inlet port 36 of the hex shaft 30, flows down the first fluid passageway 32, through the outlet port 38 and hose 43, and into the inlet port 42 of the hydraulic cylinder 40. At the same moment, hydraulic fluid from within the hydraulic cylinder 40 flows out of hydraulic outlet port 44, through hose 45 and into lower inlet port 39 on the hex-shaped shaft 30, up through the second fluid passageway 34 in the hex-shaped shaft 30, and then out of outlet 37 at the upper portion of the shaft 30 back to the hydraulic reservoir on the tractor. The fluid motion just described causes the hydraulic cylinder 40 to extend, which in turn causes the first lift link 56 and second lift link 58 to pivot relative to each other. In particular, the first and second lift links 56 and 58 become straightened, thereby expanding the four-bar linkage to raise the rotary rake 10. When the first and second lift links 56 and 58 are perfectly straight relative to each other, the four-bar linkage is then expanded to its maximum distance, resulting in the rotary rake 10 being raised to its highest position. In other words, a line drawn from the axis of upper pivot pin 60 to the axis of lower pivot pin 62 would intersect common pivot pin 64 which connects the first and second lift links 56 and 58. At this point, the hydraulic cylinder 40 has not yet been fully extended, i.e., the hydraulic cylinder 40 is only partially extended.

As the hydraulic cylinder 40 extends further, the mechanical linkage 50 passes an over-center position at which point the cylinder 40 becomes fully extended, i.e., the cylinder 40 has reached its maximum stroke length. FIG. 6 shows the rotary rake 10 in the raised, over-center position. When the hydraulic cylinder 40 is fully extended, the first and second lift links 56 and 58 are pivoted at an obtuse angle, with the obtuse angle being opposite the direction of the acute angle described earlier. Further, the lift links 56 and 58 can travel no further because the hydraulic cylinder 40 has reached its maximum stroke length. In this position, the weight of the rotary rake 10 bears down on the first and second lift links 56 and 58, tending to close the lift links with respect to each other. In other words, due to the weight of the rotary rake 10, the over-center position has the effect of holding the rotary rake 10 in the raised position so that it may be transported down a roadway or from one field to the next. No separate locking pin is required.

The mechanical linkage 50 is further held in place by virtue of the fact that the hydraulic fluid is static and does not flow, and the fluid thus holds the cylinder 40 in the extended position. The first and second lift links 56 and 58 are therefore securely held in the over-center position.

The over-center position has the further advantage that, once the rotary rake 10 has been raised to the over-center transport position, fluid in the hydraulic circuit no longer needs to be pressurized. This provides added safety to the user when connecting and disconnecting the hydraulics on the rotary rake to the hydraulics on the tractor. This is also true when the rotary rake 10 is in the lowered working position. In other words, regardless of whether the rotary rake 10 is in the raised transport position or the lowered working position, the hydraulic circuit may be depressurized so that the user can safely connect and disconnect the hydraulic hoses.

In the preferred embodiment described herein, a double acting hydraulic cylinder 40 is used in order to utilize the pressurized hydraulic fluid from the tractor to both raise the rotary rake 10 and to return it from the over-center position. A single acting cylinder would not be able to return the mechanical linkage from the over-center position.

Having described in detail the preferred embodiment of the invention, it can be seen that the main advantage of the invention is that the operator can raise and lower the rotary rake 10 by simply operating a single hydraulic control lever on the tractor. Further, it is unnecessary for the operator to leave the tractor in order to secure the rotary rake 10 in a raised transport position. The weight of the rotary rake will securely hold the mechanical linkage 50 in the partially raised, over-center position. Further, the static condition of the hydraulic fluid in the hydraulic circuit (i.e., the fact that the hydraulic fluid is not flowing) will also hold the hydraulic cylinder 40 in the fully extended position, which in turn holds the mechanical linkage 50 in the raised, over-center position. No separate operation of inserting a locking pin or other measure is required. Other objects and advantages may be apparent to those skilled in the art.

The invention described above includes all the essential elements of a hydraulic lifting mechanism for raising and lowering a rotary rake between the operative working position and the inoperative transport position. The rotary rake 10 described above may be modified, for example, by rearranging the points where the hydraulic cylinder is connected to the mechanical linkage. As another example, the double acting cylinder 40 disclosed herein may be substituted with a single action cylinder, thereby requiring only a single fluid passageway in the shaft which runs through the center of the rotary gearbox. Also, the hex shaped shaft may be replaced with a structural tube and hydraulic hoses passing through the tube for communicating the hydraulic fluid between the top and bottom of the gearbox. Although the drawings show a hydraulic cylinder in which its full stroke length is utilized, a commonly available stroke control device may be used to adjust the effective stroke length of the cylinder. Other arrangements of the hydraulic circuit or mechanical linkage may also be possible.

Therefore, specific details disclosed above are not to be interpreted as limiting, but merely as a basis for the claims and for teaching one skilled in the art to variously practice the present invention in any appropriately detailed manner. Changes may be made in the details of construction or operation of the invention without departing from the spirit of the invention, especially as defined in the following claims.

Wherefore, I claim as my invention:

1. A rotary rake for raking and windrowing hay comprising:

a rotary gearbox for rotating a set of rake arms;

a support frame for supporting and transporting the rotary rake, with the rotary gearbox being mounted above the support frame;

hydraulic lifting means for raising and lowering the rake, said hydraulic lifting means being beneath the rotary gearbox; and hydraulic port means for providing fluid communication from a remote source of pressurized hydraulic fluid to the hydraulic lifting means, said hydraulic port means extending through the center of the rotary gearbox.

2. The rotary rake according to claim 1, wherein the hydraulic lifting means comprises a mechanical linkage and a hydraulic cylinder for operating the linkage.

3. The rotary rake according to claim 2, wherein the mechanical linkage comprises an expandable and contractable four-bar linkage.

4. The rotary rake according to claim 3, wherein the hydraulic cylinder is pivotably connected to two bars of the four-bar linkage for expanding and contracting said linkage.

5. The rotary rake according to claim 1, wherein the hydraulic lifting means has a lowered position for lowering the rake to an operating position, a raised position for raising the rake, and an over-center position for holding the rake in a substantially raised transport position.

6. The rotary rake according to claim 4, wherein the four-bar linkage comprises at least a first lift link and a second lift link; and wherein the hydraulic cylinder is retractable and extendable between:

a retracted position whereby the first and second lift links are pivoted at an acute angle relative to each other, thereby lowering the rake to a working position;

a partially extended position whereby the first and second lift links are substantially straight relative to each other thereby raising the rake; and a fully extended position whereby the first and second lift links are pivoted at an obtuse angle for holding the rake in a raised transport position.

7. The rotary rake according to claim 6, wherein the pivotal movement of the first and second links is limited by the stroke length of the hydraulic cylinder.

8. The rotary rake according to claim 7, wherein the hydraulic cylinder is a double acting hydraulic cylinder.

9. A rotary rake for raking and windrowing hay comprising:

a rotary gearbox for rotating a set of rakes;

a support frame and wheelbase assembly for supporting the rotary gearbox and for transporting the rotary rake;

a linkage on the support frame for raising and lowering the rotary rake;

a fluid-powered cylinder for operating the linkage; and a fluid port extending through the center of the rotary gearbox.

10. The rotary rake according to claim 9, wherein the fluid port comprises a vertical shaft which includes a pair of fluid passageways extending substantially the length of the shaft.

11. The rotary rake according to claim 10, further comprising a means for coupling the shaft to a remote source of pressurized fluid to operate the cylinder, and a means for coupling the rotary gearbox to a remote source of mechanical power to rotate the set of rakes.

12. The rotary rake according to claim 9, wherein the linkage is operable between a lowered position, a raised position, and a partially raised over-center position.

13. The rotary rake according to claim 12, wherein the linkage comprises a center frame member, a support brace on the wheelbase assembly, a first lift link and a second lift link, and the cylinder is operably connected to at least one of the lift links.

14. A rotary rake for raking and windrowing hay comprising:

a support frame which includes a mechanical linkage for raising and lowering the rake;

a rotary gearbox on the support frame for rotating a set of rake arms;

a hydraulic fluid port extending through the center of the rotary gearbox; and a hydraulic cylinder on the support frame for operating the mechanical linkage.

15. The rotary rake according to claim 14, wherein the hydraulic fluid port comprises a vertical shaft with a fluid passageway extending between upper and lower portions of the shaft, with the upper portion of the shaft being above the rotary gearbox and the lower portion being below the rotary gearbox.

16. The rotary rake according to claim 14, wherein the mechanical linkage is operable between a lowered position, a raised position, and a partially raised over-center position.

17. The rotary gearbox according to claim 16, wherein the support frame and mechanical linkage comprises:

a wheelbase frame member;

a center frame member pivotally connected to the wheelbase frame member;

a first lift link pivotally connected to the wheelbase frame member;

a second lift link pivotally connected to the center frame member; and the first and second lift links are pivotally connected to each other.

18. The rotary rake according to claim 17, wherein the hydraulic cylinder is operably connected to pivot the lift links relative to each other to thereby raise and lower the rotary rake.

19. The rotary rake according to claim 17, wherein the hydraulic cylinder is a double acting hydraulic cylinder.

20. The rotary rake according to claim 17, wherein operable movement of the mechanical linkage is limited by stroke length of the hydraulic cylinder.

* * * * *